United States Patent [19]

Stanfield et al.

[11] Patent Number: 4,774,629
[45] Date of Patent: Sep. 27, 1988

[54] CONTROL UNIT HEIGHT ADAPTER

[75] Inventors: Harold W. Stanfield, Mequon, Wis.; Richard A. VonRotz, Peru, Ind.

[73] Assignee: Square D Company, Palatine, Ill.

[21] Appl. No.: 898,179

[22] Filed: Aug. 20, 1986

[51] Int. Cl.⁴ .............................................. H02B 1/20
[52] U.S. Cl. .................................... 361/346; 361/336; 361/338; 361/355
[58] Field of Search ................ 361/346, 355, 336, 338

[56] References Cited

U.S. PATENT DOCUMENTS

| | | | |
|---|---|---|---|
| 3,493,818 | 2/1970 | Paape et al. ........................... | 361/355 |
| 3,689,128 | 9/1972 | Andreini et al. ...................... | 361/338 |
| 4,249,227 | 2/1981 | Kato et al. ........................... | 361/336 |
| 4,360,857 | 11/1982 | Olashaw .............................. | 361/346 |

Primary Examiner—Robert S. Macon
Attorney, Agent, or Firm—T. B. Lindgren; M. R. Jankousky

[57] ABSTRACT

A control center section comprising a frame having a plurality of control units mounted within a saddle and each having electrical components requiring wiring. The height of the saddle may be extended or modified by adding a saddle extender to the bottom edge of the saddle. This provides room for mounting additional electrical devices or wiring, or making other modifications.

13 Claims, 6 Drawing Sheets

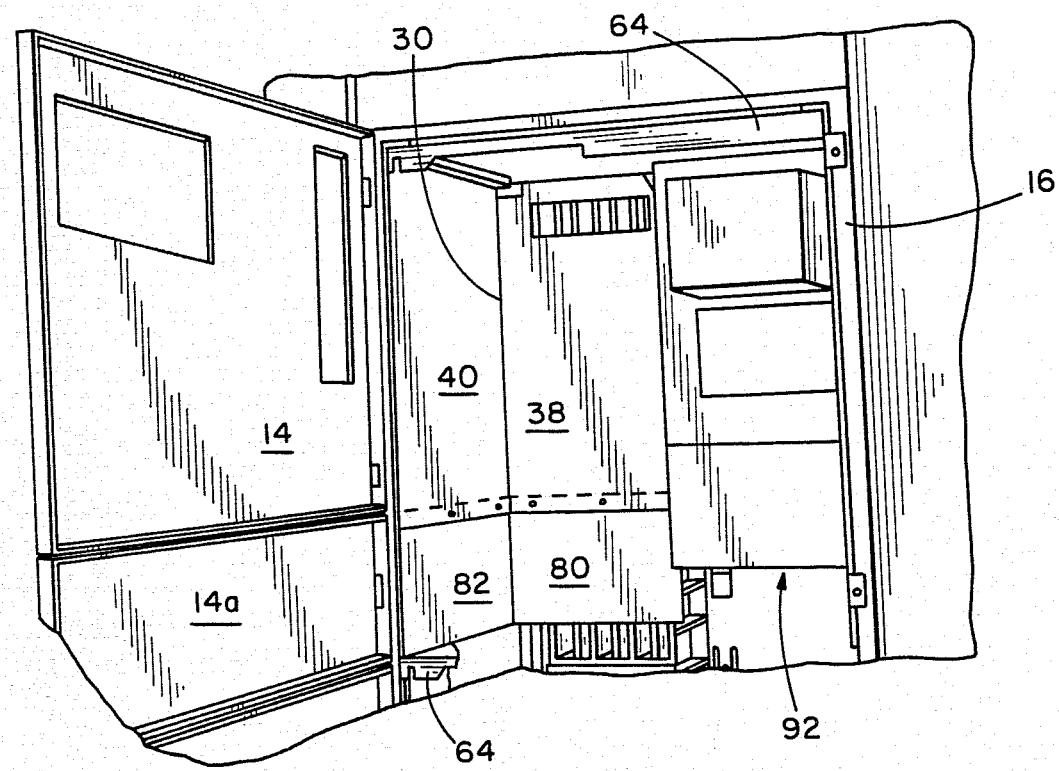
FIG. 5
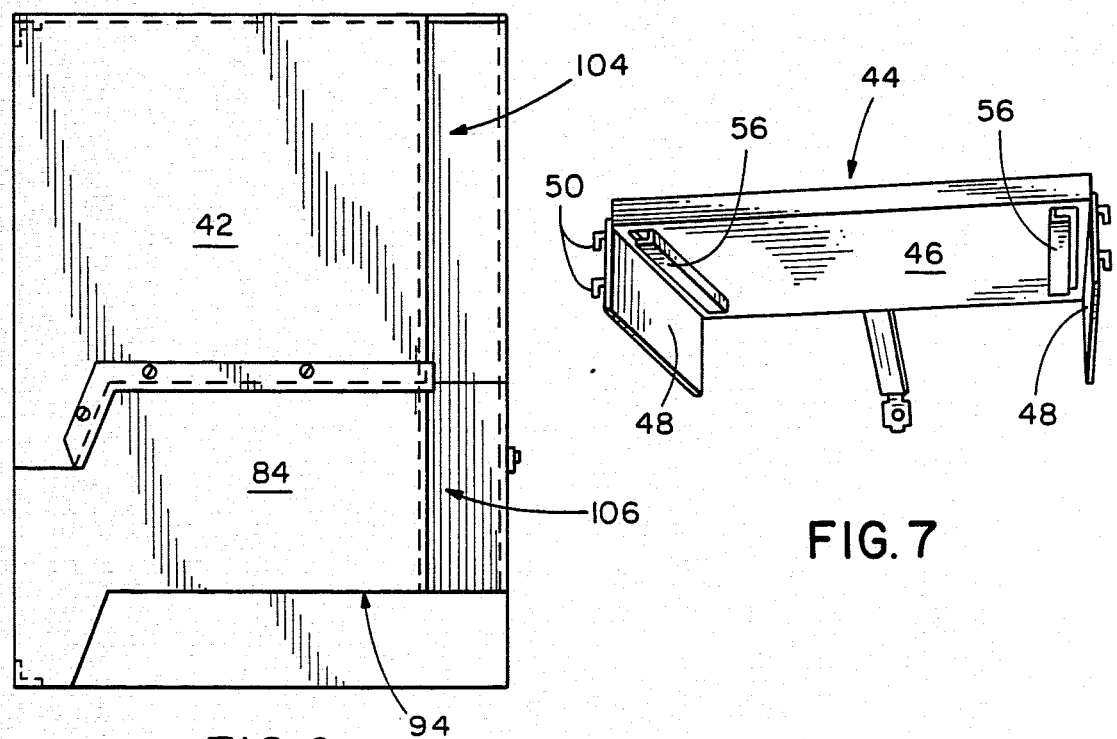
FIG. 6
FIG. 7

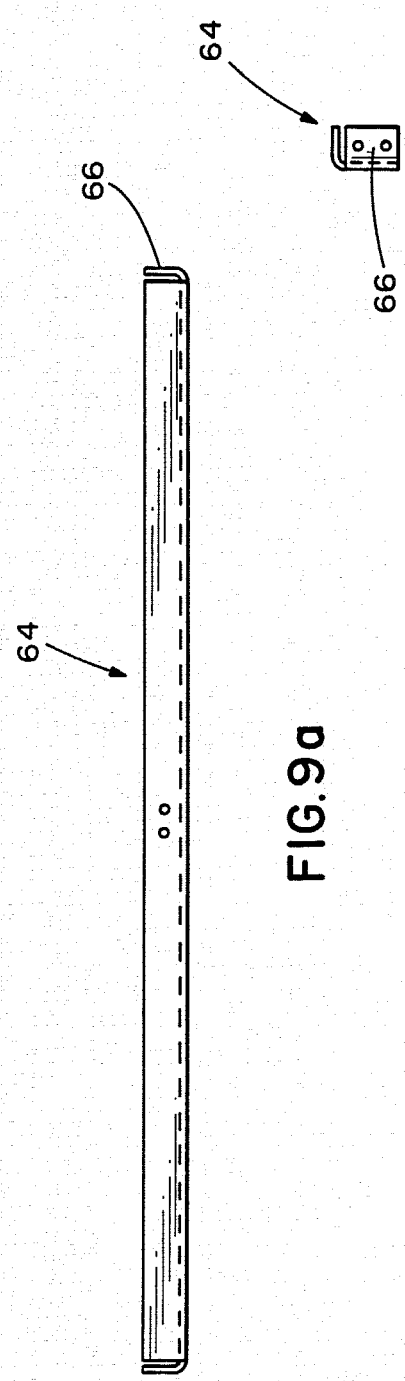
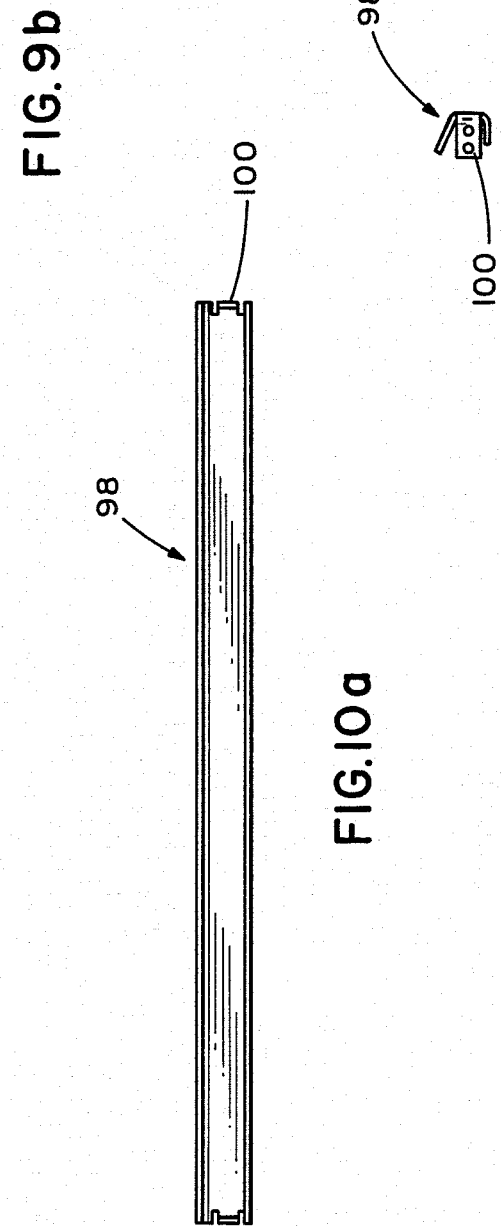

CONTROL UNIT HEIGHT ADAPTER

BACKGROUND OF THE INVENTION

This invention relates to a motor control center and is more particularly directed to a motor control center having individual control unit structures housing electrical control components that are modified periodically.

In industrial plants electrical power supplied to various equipment is generally controlled by control units which include components such as relays, circuit breakers, switches, motor starters, wiring, terminal blocks, etc. The control units for a given area of a plant are usually located in a single motor control center. The control units are stacked one on top of the other in separate control center sections which are then placed side by side. One advantage of motor control centers over other types of control equipment is their capability of being modified to accommodate changing requirements of the plant equipment. Additional components may be added to the control units after the motor control center is placed in service.

To facilitate wiring and servicing of the control units, the components are located in a saddle which may be easily removed from the motor control center after unlatching the control unit and disconnecting the electrical wiring. The size of each unit saddle or structure will depend on the number and type of the electrical devices desired in each of such units. The size, spacing and number of prepunched holes in each size of saddle may also vary to accommodate the different ratings of the electrical components, such as circuit breakers and motor starters. In the prior art the large number of possible combinations of sizes and ratings required that the saddle be made in many sizes and ratings to accommodate the extreme range of customer needs. It is desirable to provide a saddle that will accommodate a large number of different component groupings.

Additionally, after the motor control center is installed, the user may determine that additional electrical devices are required or that extra room for working with wiring is desired. In the prior art the customer could not modify the size of an existing unit saddle, but had to replace the existing unit saddle with a unit saddle that provided the necessary additional length.

It is an object of the present invention to provide a control center unit saddle that has a maximum flexibility for installation of the individual control units.

A further object of the present invention is to provide a unit saddle that can accommodate the installation of additional devices after the control center is in service.

Further objects and features of the invention will be readily apparent from the specification and appended drawings illustrating certain preferred embodiments.

SUMMARY OF THE INVENTION

The present invention relates to a control center section having a section frame and a number of control units stacked one on top of the other. Each control unit includes components such as motor starters, circuit breakers, etc. mounted within a saddle that is easily removable from the frame. At least one of the control units will include a saddle extender, also referred to as a control unit height adapter, connected to the saddle. The saddle has three vertical sides with a substantially open top, bottom and front. The top of the saddle has turned in edges of the two opposite sides of the saddle. The front of the saddle has a top saddle angle and bottom saddle angle riveted to the two opposite sides of the saddle to provide support. To accommodate a large number of electrical control components or a modification after the control center has been placed in service, a saddle extender, or control unit height adapter, is used for mounting some of the components. The saddle extender has three vertical sides that match the shape of the respective saddle and also follow the outline of the lower edge. The top edge of each saddle extender includes a number of holes that mate with the holes in the bottom edge of the saddle. A lower saddle angle is placed across the front of the saddle extender at the lower front edge of the saddle extender.

DESCRIPTION OF THE DRAWINGS

FIG. 5 is a perspective view of an offset saddle and saddle extender mounted within a motor control center section.

FIG. 6 is a side view of an offset saddle and a saddle extender.

FIG. 7 is a perspective view of a unit shelf.

FIG. 9a is a top view of a top saddle angle.

FIG. 9b is an end view of a top saddle angle.

FIG. 10a is a top view of a bottom saddle angle.

FIG. 10b is an end view of a bottom saddle angle.

DESCRIPTION OF THE PREFERRED EMBODIMENT

Figure 1:
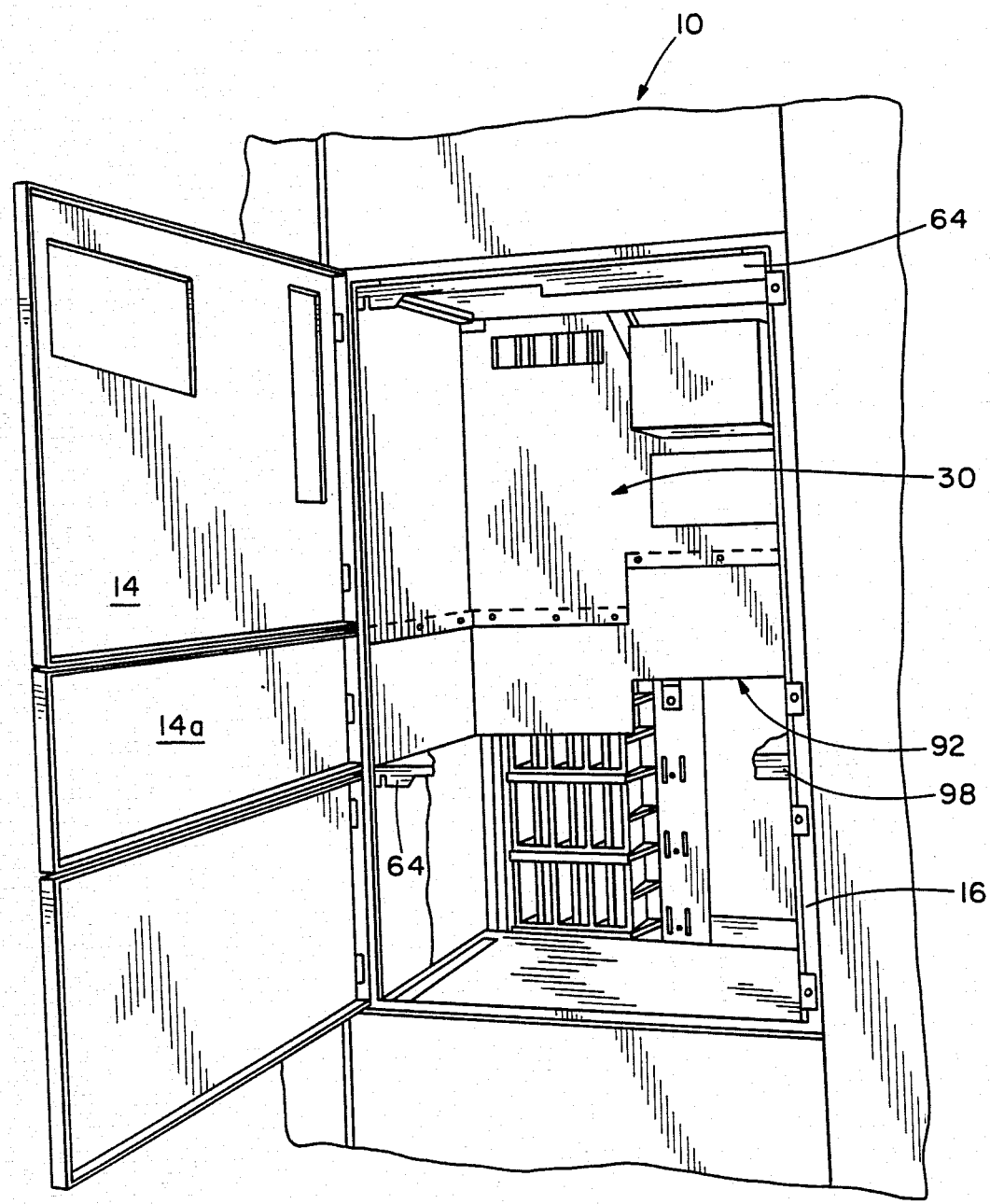
FIG. 1 is a perspective view of a saddle and saddle extender mounted within a motor control center section.

Referring now to FIG. 1 of the drawings, there is shown a control unit saddle assembly 30 housed in a control center 10. A control center 10 is generally comprised of a number of vertical control center sections 13 that are placed side by side (see FIG. 8). The individual control units 12 (see FIG. 8) are positioned one on top of the other within a control center section 13. The door 14, connected to the frame 16 (see FIG. 5), is open to provide access to the control unit 12. The door 14 is connected to the control center section 13 in a manner described in Ser. No. 898,178, entitled "Control Center Unit Shelf Assembly" by H. W. Stanfield and R. VonRotz filed simultaneously herewith and herein incorporated by reference. The door 14 has a lower portion 14a, which is utilized in conjunction with the saddle extender 34. Related aspects of the control center that is the subject of this invention are more fully described in the following copending applications filed simultaneously herewith and herein incorporated by reference: Ser. No. 898,474, entitled "Advanceable And Retractable Plug-In Unit Assembly For A Motor Control Center" by S. Ledbetter and R. Cox, and Ser. No. 898,175, entitled "Horizontal Bus Bar Splice For Control Center" by H. W. Stanfield and R. VonRotz.

Figure 2:
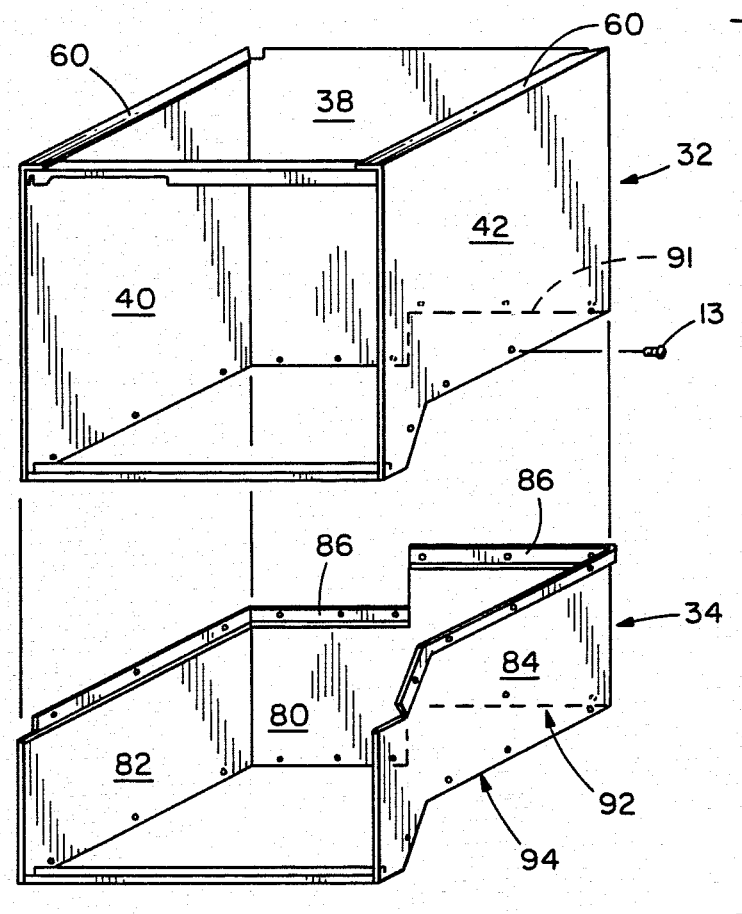
FIG. 2 is an exploded view of a saddle and saddle extender.
Figure 8:
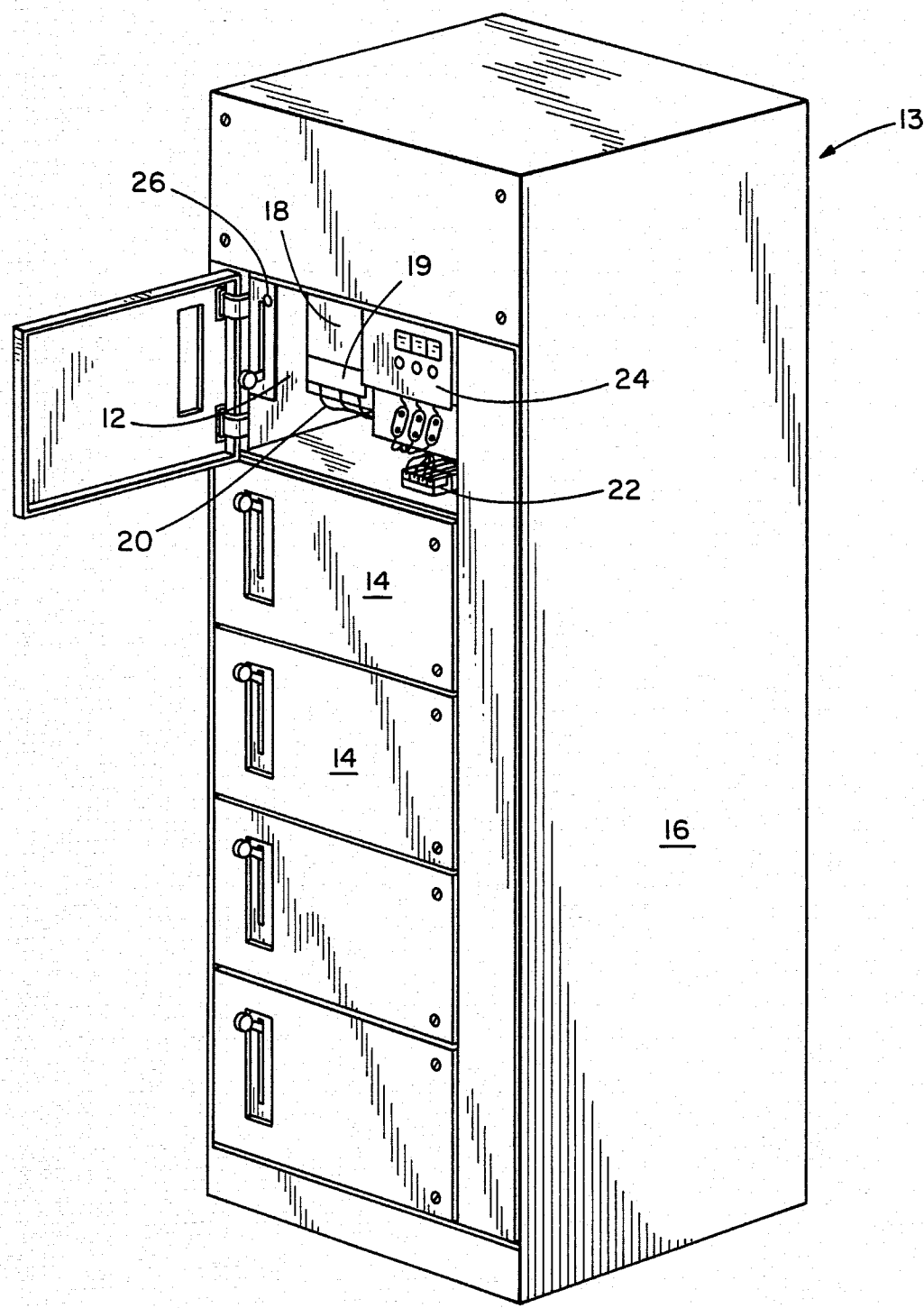
FIG. 8 is a perspective view of a motor control center section.

Referring now to FIG. 8, the control unit 12 includes, by way of example, a circuit breaker 18, wiring 20, terminal blocks 22 and a motor starter 24. Generally, the components necessary to control a given piece of plant equipment are located within one control unit 12. The above-described electrical devices are mounted on a saddle 32 or saddle and saddle extender 34 as shown in FIG. 2. The saddle extender 34 is attached to the saddle 32 by means of appropriately sized screws 13 (only one of which is depicted in FIG. 2).

Figure 11:
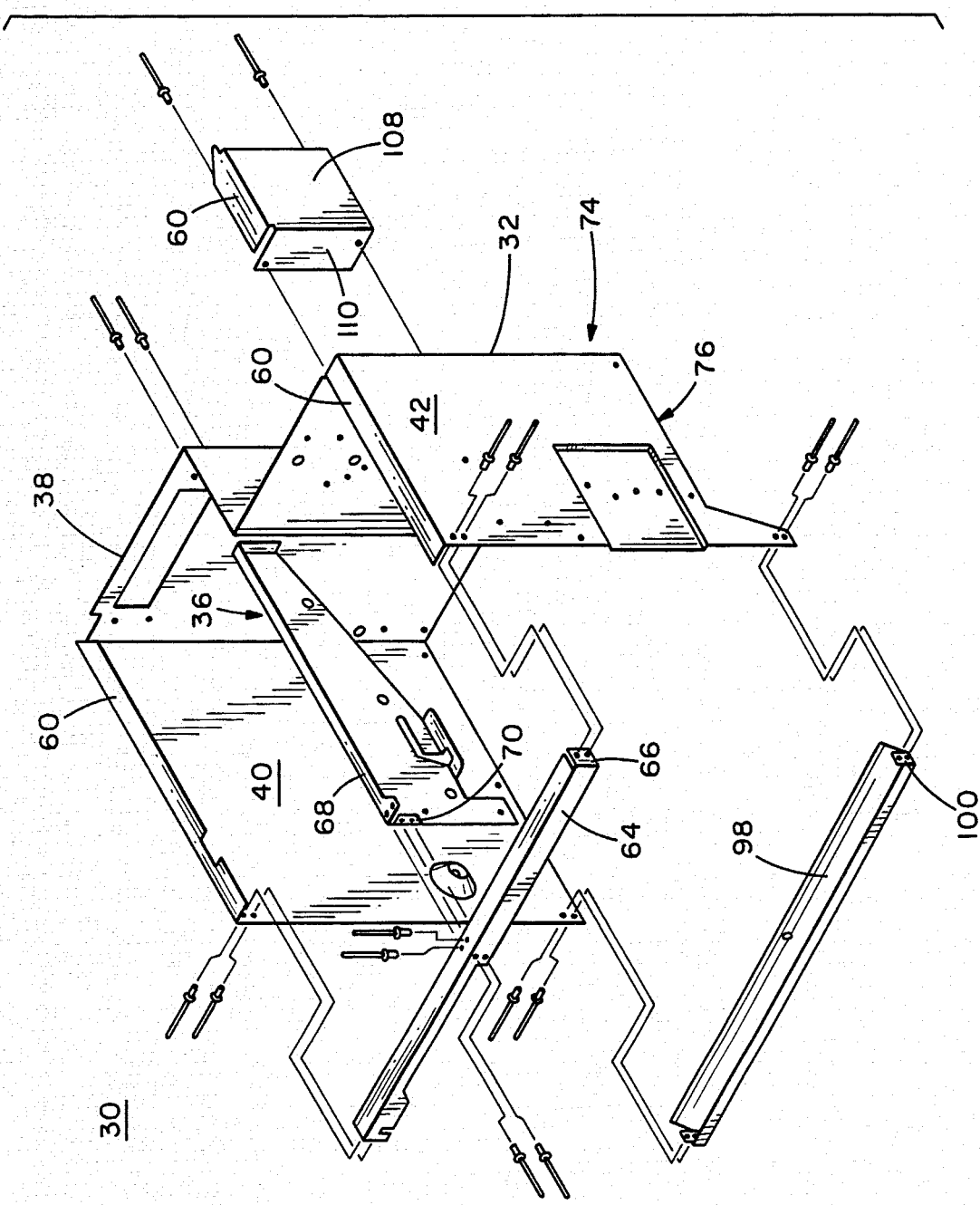
FIG. 11 is an exploded view of a saddle assembly.

The saddle assembly 30 (see FIG. 11) includes a saddle 32, top saddle angle 64, bottom saddle angle 98, arm 36 and may also include a saddle extender 34. The saddle 32 has a back 38, two opposite sides 40 and 42 and an open top, bottom and front. The sides 40, 42 of the saddle are folded in at the top to form respective flanges 60 that extend along the sides of the saddle 32.

The saddle 32 is strengthened by a top saddle angle 64 or first support and a bottom saddle angle 98 or second support. The top saddle angle 64 has an approximately L-shaped cross section with inwardly turned ends 66. The top saddle angle 64 is riveted at its ends 66 to sides 40 and 42 of the saddle. The upper edge 68 and front edge 70 of the arm 36 are each riveted to the top saddle angle 64 to provide additional support for the arm 36.

The arm 36 extends from the top saddle angle 64 to the back 38 of the saddle 32 to provide additional support. The circuit breaker 18 (or optional motor circuit switch 19) is mounted between the arm 36 and one side 40 of the saddle. The motor starter 24 and switch 26 are likewise mounted to either the saddle 32 or the saddle extender 34. The terminal blocks 22 are mounted on the unit shelf 44. The terminal blocks 22 are of the pull-apart type. A first stationary part of the terminal block accepts the field wiring from the user's equipment and is mounted on the unit shelf 44. The second removable part of the terminal block is electrically and mechanically connected to the control equipment. When the power to the control unit is shut off, the terminal block may be separated into the two parts to provide for faster removal of the control unit.

Referring again to FIG. 11, the back 38 and side 42 of the saddle 32 each include a cutaway portion, 74 and 76, respectively. These cutaway portions 74 and 76 allow the terminal block 22 to be separated and the control unit 12 removed without unbolting a portion of the terminal block or disconnecting the customer's wiring. The first part of the terminal block remains bolted to the shelf 44 below the control unit and passes through the cutaway portion 74 as the control unit 12 is slid from the control center section 13.

The saddle extender 34 is also formed of metal and may be made of varying heights. Because of the benefits of standardizing, multiples of 3 inches are conveniently used. The saddle extender 34, like the saddle 32, comprises a back 80 and two opposite sides 82 and 84. The upper edge of the saddle extender 34 has offset tabs 86 that are offset by the thickness of the saddle 32 to be positioned behind the lower edge of the saddle and riveted thereto. The inside surfaces of the saddle 32 and saddle extender 34 form a smooth, level surface for mounting of components.

The height of the saddle extender is approximately consistent around its perimeter even though the shape follows the outline of the bottom edge 91 of the saddle. Thus the saddle extender back 80 and side 84 also include cutaway portions 92 and 94, respectively, that correspond to the cutaway portions of the saddle 32. A first saddle extender may be mounted to a saddle and a second saddle extender may be mounted to the first saddle extender. A saddle extender 34 used in conjunction with a saddle 32 provides space for mounting additional electrical control components without obstructing the hole pattern for the appropriate rated electrical components in the original saddle. This reduces the inventory required and also allows additional components to be added without rearranging the original components.

Figure 3:
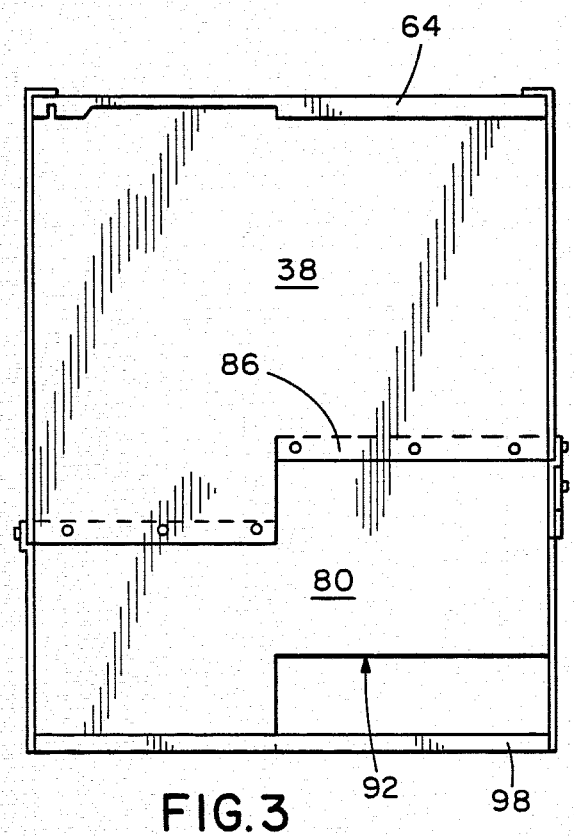
FIG. 3 is a front view of a saddle and saddle extender.
Figure 4:
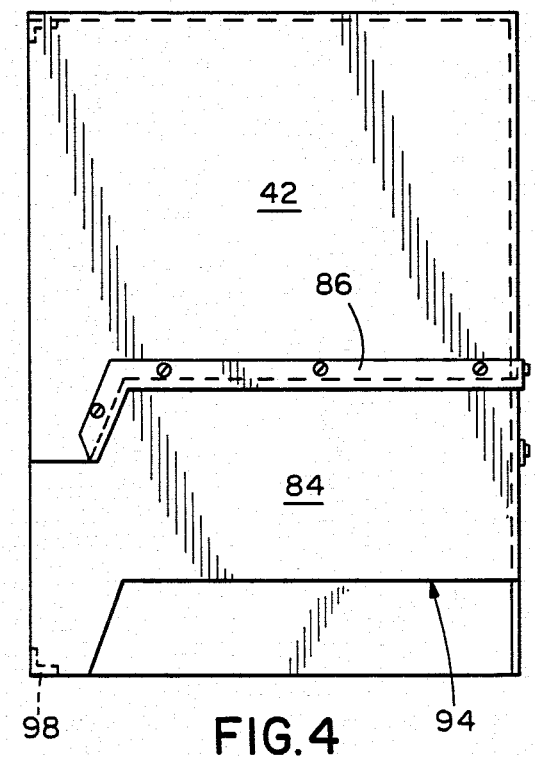
FIG. 4 is a side view of a saddle and saddle extender.

The lower end of the saddle assembly 30 is held together by a bottom saddle angle 98 that is riveted by its tips 100 to the lower front corner of the sides of the saddle extender 34. The bottom saddle angle previously placed at the lower front edge of the sides of the saddle 32 may be removed to allow easier access to the control equipment. If the saddle extender has been previously installed at the factory, the bottom saddle angle will be physically located on the saddle extender (and not on the saddle). If the saddle extender was field installed, there will be a bottom saddle angle on the saddle, as well as on the saddle extender. The saddle and saddle extender may either have a flat back 38 and 80, respectively, as shown in FIGS. 3 and 4, or an offset back 104 and 106, respectively, as shown in FIGS. 5 and 6. The saddle and saddle extender with offset backs accommodate the mounting of a component, such as a control transformer, on the outside of the saddle or saddle extender to reduce the heat rise inside the saddle assembly. The offset backs 104 and 106 require an additional support 108 for stability. The support 108 includes a front ledge 110 connected to the offset back 104 and a ledge sized and adapted to physically connect to the unit shelf groove 56. The top flange 60 of support 108 replaces the missing portion of the flange 60 on the offset saddles.

The entire saddle assembly 30 hangs from a unit shelf 44. The shelf 44 comprises a flat surface 46 having on each of its side flange 48. On the front edge of each flange are two hooks 50 which mate with holes in the front edge of the frame 16. This method is described in more detail in PE-12, identified above.

The flat surface 46 also has two grooves 56 positioned adjacent to and parallel to the flanges 48. The tongue 60 located on the saddle 32 is sized and adapted to mate with the groove 56 of the shelf. The saddle assembly 31 is inserted into the section by placing the tongue 60 within the groove 56 and sliding the control unit into the cabinet.

While the present invention has been illustrated and described in conjunction with a number of embodiments thereof, it is to be understood that numerous changes and modifications may be resorted to without departing from the spirit and scope of the present invention.

We claim:

1. A control unit for insertion into and removal from a control center, the control center having at least one shelf mounted therewithin adaptable to receive the control unit, said control unit being adapted to contain electrical control apparatus, said control unit comprising:
    a saddle mounted within the control unit and hanging from the shelf, said saddle having a back and two opposite sides, the back and two sides each having a lower edge,
    a first set of the electrical control apparatus being mounted on said saddle; and
    a saddle extender having a back and two opposite sides, said saddle extender being adaptable to be easily connected to the lower edge of said saddle without disturbing the first set of electrical control apparatus.

2. A control unit as claimed in claim 1 additionally comprising a first support and a second support, each of said supports having two opposite ends, said first support having one end connected adjacent the edge of each of the opposite sides of said saddle, said second support having one end connected adjacent the edge of a respective opposite side of said saddle.

3. A control unit as claimed in claim 1 wherein said saddle and saddle extender each have respective top and bottom edges, wherein the top edge of said saddle extender follows substantially the same outline as the bottom edge of said saddle, thereby allowing positioning of the saddle extender along the bottom edge of said saddle.

4. A control unit as claimed in claim 1 wherein said saddle and said saddle extender are substantially bottomless.

5. A control unit as claimed in claim 4 wherein said saddle extender includes an offset top edge, the offset top edge being connected to the bottom edge of said saddle, wherein one surface of said saddle and one surface of said saddle extender form a substantially planar surface.

6. A control center for controlling a remote load electrically connected to said control center by incoming wires, said control center comprising:
a cabinet;
a control unit saddle adapted to be removably inserted into said cabinet, said saddle having a back, two substantially opposite sides, an open bottom and a lower edge;
electrical control apparatus positioned completely within said saddle; and
a saddle extender having a back, two substantially opposite sides, an open bottom and a top edge, said saddle extender being adapted so that the top edge may be connected to the lower edge of said saddle.

7. A control center as claimed in claim 6 additionally comprising a shelf mounted within said cabinet, said saddle being adapted to hang from said shelf.

8. A control center as claimed in claim 6, wherein said saddle extender has a lower edge that substantially follows the outline of the lower edge of said saddle.

9. A control center as claimed in claim 6 wherein said saddle extender has an offset top edge that is connected to the bottom edge of said saddle, wherein the inside surface of said saddle and the inside surface of said saddle extender form a substantially planar surface.

10. A control center as claimed in claim 6 additionally comprising:
a first shelf positioned within said cabinet below said saddle and said saddle extender; and
a terminal block comprising a first part and a second part, the first part receiving the incoming wires and being connected to said shelf, the second part being electrically and mechanically connected with said electrical control apparatus, the first part and the second part being separable;
said saddle extender additionally comprising a cutaway portion on its back to allow said saddle to be removed from said cabinet when the terminal block first part and second part are separated.

11. A control center comprising:
a frame;
a control unit saddle having a top, a back, two substantially opposite sides, and a substantially open bottom, said control unit back having a cutaway portion near its lower edge, said saddle being adapted for sliding into and out of said frame;
a first shelf mounted within said frame, said first shelf being positioned below said saddle; and
electrical control apparatus mounted on said first shelf, said control apparatus being positioned on said first shelf to allow said saddle to be slid into and out of said frame without disturbing said control apparatus.

12. A control center as claimed in claim 11 additionally comprising a second shelf mounted within said frame above said saddle, said saddle hanging from said second shelf.

13. A control center as claimed in claim 12 additionally comprising a second saddle, said second saddle hanging from said first shelf.

* * * * *